(12) United States Patent
Choi

(10) Patent No.: US 6,310,890 B1
(45) Date of Patent: Oct. 30, 2001

(54) SYSTEM FOR PROCESSING, CONVERTING AND DISTRIBUTING A MESSAGE IN A FIXED SUBSCRIBER UNIT IN A BROAD BAND CODE DIVISION MULTIPLE ACCESS WIRELESS LOCAL LOOP

(75) Inventor: Tae-Ho Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/061,931

(22) Filed: Apr. 17, 1998

(30) Foreign Application Priority Data

Apr. 18, 1997 (KR) .................................................. 97-14523

(51) Int. Cl.⁷ ................................ A04B 7/216; A04J 3/16
(52) U.S. Cl. ............................ 370/469; 370/466; 370/469
(58) Field of Search .................................. 370/469, 400, 370/467, 328, 349, 385, 389, 401, 465, 466, 463, 335

(56) References Cited

U.S. PATENT DOCUMENTS 5,642,356 * 6/1997 Wenk ..................................... 370/337
5,796,742 * 8/1998 Klotzbach et al. ................... 370/466
5,960,004 * 9/1999 Ramstrom et al. ................... 370/469

* cited by examiner

Primary Examiner—Alpus H. Hsu
Assistant Examiner—Duc Ho
(74) Attorney, Agent, or Firm—Dilworth & Barrese, LLP

(57) ABSTRACT

Disclosed is a system of processing, converting and distributing a message in the network hierarchy of a fixed subscriber unit (FSU) in a Broad band Code Division Multiple Access Wireless Local Loop (B-CDMA WLL). The network hierarchy includes first to seven layers. The first layer is provided with a SLIC2, ADPCM/PCM module, MAC module, PHL module and LLME. The second layer is provided with a DLC module. The third layer is provided with a network module. The higher layers are provided with a subscriber module and a retaining module. The network module serves to process and format a message communicated between the LLME and the subscriber or retaining module to distribute the formatted message among the subscriber and retaining modules or conversely to transfer it to the LLME.

6 Claims, 6 Drawing Sheets

SYSTEM FOR PROCESSING, CONVERTING AND DISTRIBUTING A MESSAGE IN A FIXED SUBSCRIBER UNIT IN A BROAD BAND CODE DIVISION MULTIPLE ACCESS WIRELESS LOCAL LOOP

BACKGROUND OF THE INVENTION

1. Field of the Invention

The present invention relates to a system for executing mutual protocol in an electronic communications system, and more particularly to a system of processing, converting and distributing a message in a network hierarchy for a fixed subscriber unit (FSU) in a Broad band Code Division Multiple Access Wireless Local Loop (B-CDMA WLL).

2. Description of the Related Art

Conventionally, a network hierarchy of an FSU and radio carrier station (RCS) in the B-CDMA WLL includes 7 layers according to the Open Systems Interconnection (OSI) model of the International Organization for Standardization (ISO), as shown in FIG. 1. In the first layer L1 PHL/MAC (Layer 1 Physical/Medium Access Control), the FSU comprises a subscriber line interface circuit module (SLIC2) 2, ADPCM/PCM module 4, MAC module 6 and PHL module 8 while the RCS comprises a PHL module 22 and MAC module 24. The second layer L2 DLC (Layer 2 Data Link Control) provides the FSU and RCS with their respective DLC modules 20 and 26. The third layer L3 NWK (Layer 3 NetWork) provides the FSU with a network module 18. The higher layers provide the FSU with a subscriber module 12, retaining module 14, and message conversion and distribution module 16. In addition, the FSU and RCS include lower layer management entities (LLME) 10 and 28.

FIG. 1 illustrates the conventional network hierarchy of the FSU including a message conversion and distribution module 16, which formats a message communicated between the network module 18 and the higher modules (subscriber module 12 and retaining module 14) to distribute the formatted message among the higher modules 12 and 14.

Describing the function of the network module 18 to control the message transferred to the subscriber module 12 and the retaining module 14 with reference to the flow chart of FIG. 2, the network module 18 analyzes the message in step 200 to determine in step 202 whether it is an error or normal. If it is an error, an error message is treated in step 204 and processing and transferring steps for the message are bypassed. Otherwise, a normal message is processed and formatted in step 206, and transferred in step 208 to the message conversion and distribution module 16, which again analyzes and format the formatted message to be accommodated to distribute it among the subscriber and retaining modules 12 and 14.

Conversely, describing the function of the network module 18 to control the message coming from the subscriber and retaining modules 12 and 14 with reference to the flow chart of FIG. 3, the message conversion and distribution module 16 analyzes and formats the message to be transferred to the network module 18, which in turn executes the steps 300 to 308 similar to those of FIG. 2 to transfer to the DLC module 20.

The conventional system as described suffers from the drawback that the message conversion and distribution module 16 requires the message exchange and corresponding protocol with the network module 18, which degrades the speed of processing data.

SUMMARY OF THE INVENTION

It is an object of the present invention to provide a method of processing, converting and distributing a message communicated between a network module and a subscriber module and a retaining module in a network hierarchy of an FSU in the B-CDMA WLL, which does not require the message conversion and distribution module.

According to the present invention, there is provided a system of processing, converting and distributing a message in the network hierarchy of a fixed subscriber unit (FSU) in a Broad band Code Division Multiple Access Wireless Local Loop (B-CDMA WLL). The network hierarchy includes first to seven layers. The first layer is provided with a SLIC2, ADPCM/PCM module, MAC module, PHL module and LLME. The second layer is provided with a DLC module. The third layer is provided with a network module. The higher layers are provided with a subscriber module and a retaining module. The network module serves to process and format a message communicated between the LLME and the subscriber or retaining module to distribute the formatted message among the subscriber and retaining modules or conversely to transfer the message to the LLME.

The present invention will now be described by way of example with reference to the figures.

DETAILED DESCRIPTION OF PREFERRED EMBODIMENTS

Figure 1:
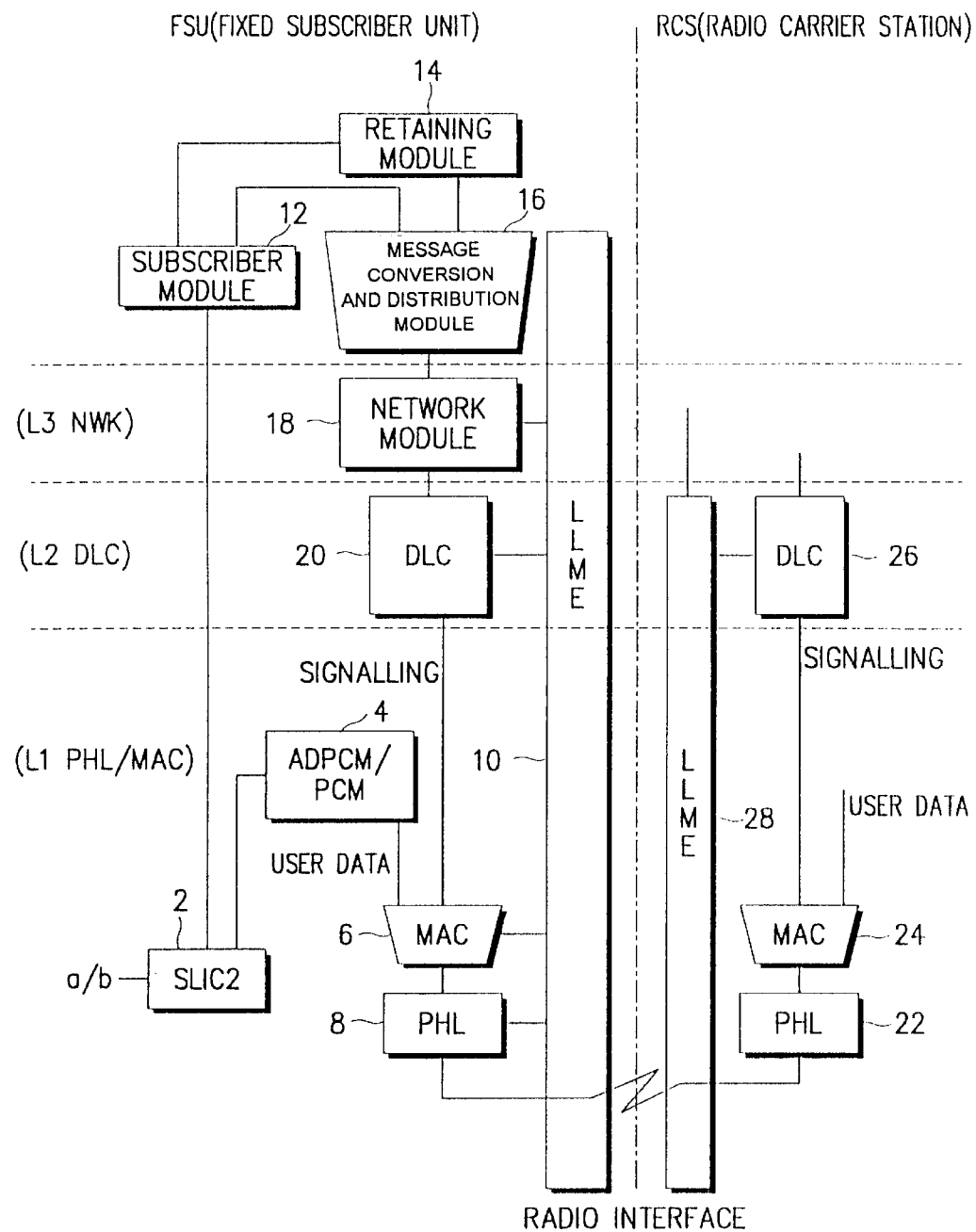
FIG. 1 is a block diagram for illustrating the conventional network hierarchy of an FSU and RCS in a B-CDMA WLL.
Figure 2:
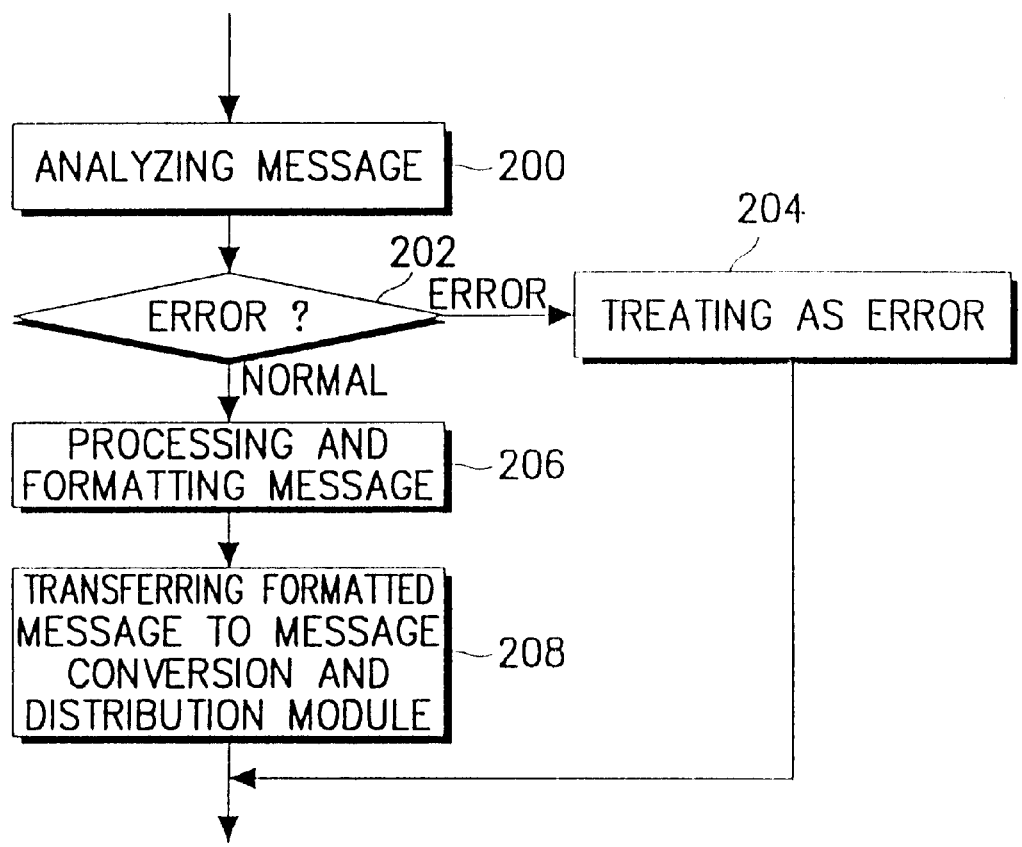
FIG. 2 is a flow chart for illustrating the function of a conventional network module to control a message transferred to a subscriber module and a retaining module.
Figure 3:
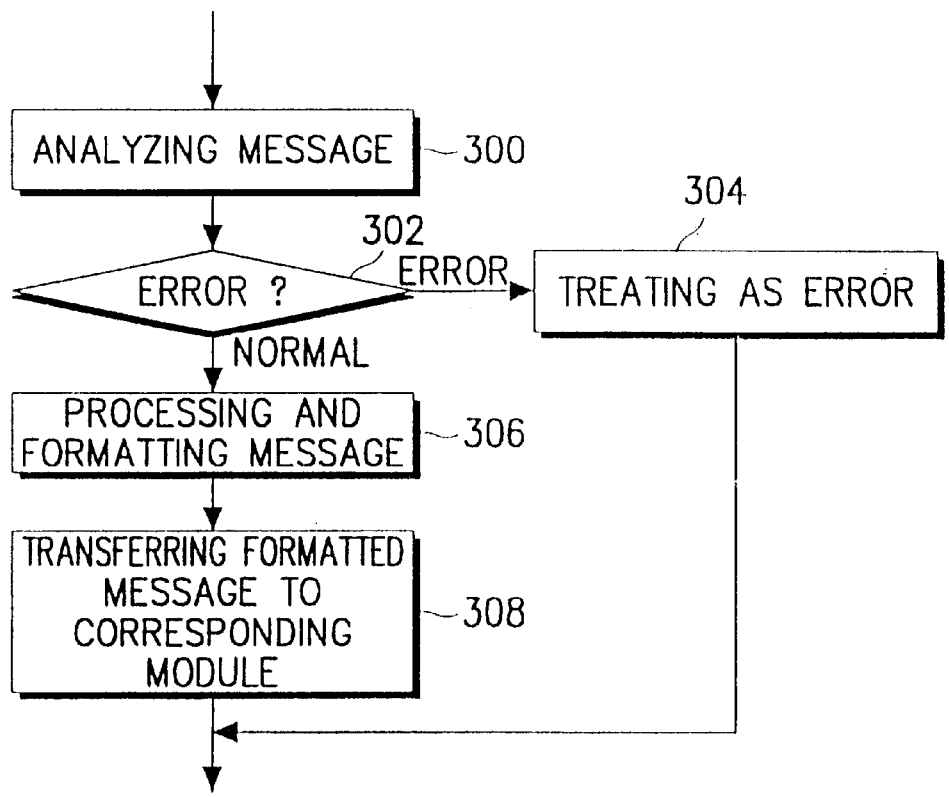
FIG. 3 is a flow chart for illustrating the function of the conventional network module to control the message coming from the subscriber and retaining modules.
Figure 4:
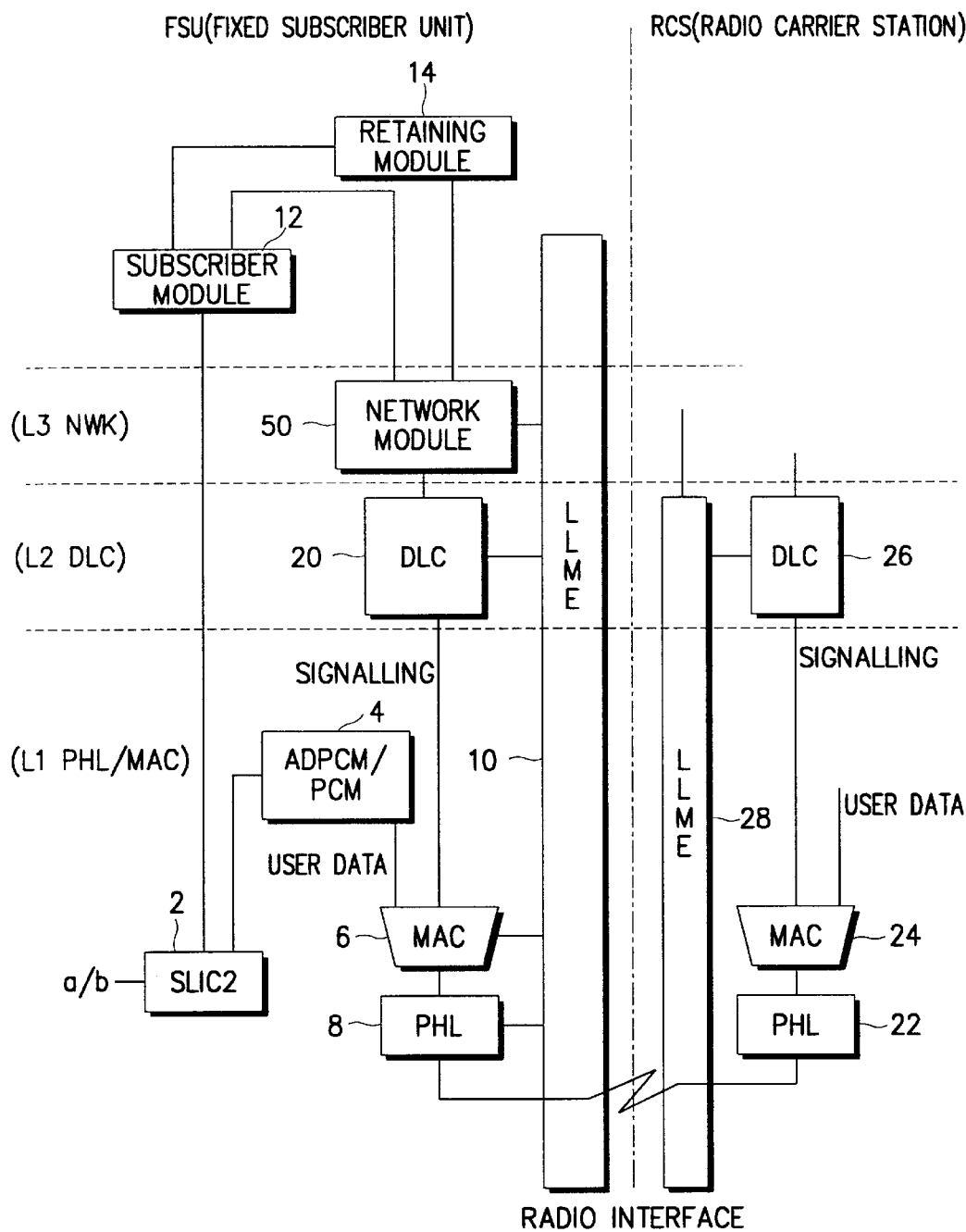
FIG. 4 is a block diagram for illustrating an inventive network hierarchy of an FSU and RCS in a B-CDMA WLL.

As shown in FIG. 4, an inventive network hierarchy has no message conversion and distribution module 16, which was the element used to enable the message exchange between the subscriber and retaining modules and the network module in the conventional network hierarchy as shown in FIG. 1. This eliminates the message exchange and corresponding protocol for the network module to communicate with the subscriber and retaining modules. Hence, the data processing speed is improved.

The inventive network hierarchy of the FSU and RCS in the B-CDMA WLL enables the network module 50 to directly format the message from the DLC module 20 or LLME module 10 to be used by the subscriber module 12 or retaining module 14 without employing the conventional message conversion and distribution module 16 as shown in FIG. 1. Of course, the message from the subscriber module 12 or retaining module 14 is directly transferred to the network module 50 without passing the message conversion and distribution module 16 of FIG. 1. This is achieved by revising the routine of the network module 50 to include the formatting and distribution routine of the conventional message conversion and distribution module 16. Thus, the message conversion and distribution module is eliminated, so that there is no need to have the message exchange and corresponding protocol between the message conversion and distribution module and the network module.

The network module 50 carries out the three essential operational steps for analyzing the message exchanged between the FSU and the RCS: determining whether the message is normal or error, processing the message and formatting the message to be distributed among the subscriber and retaining modules or conversely to be transferred to the LLME.

Figure 5:
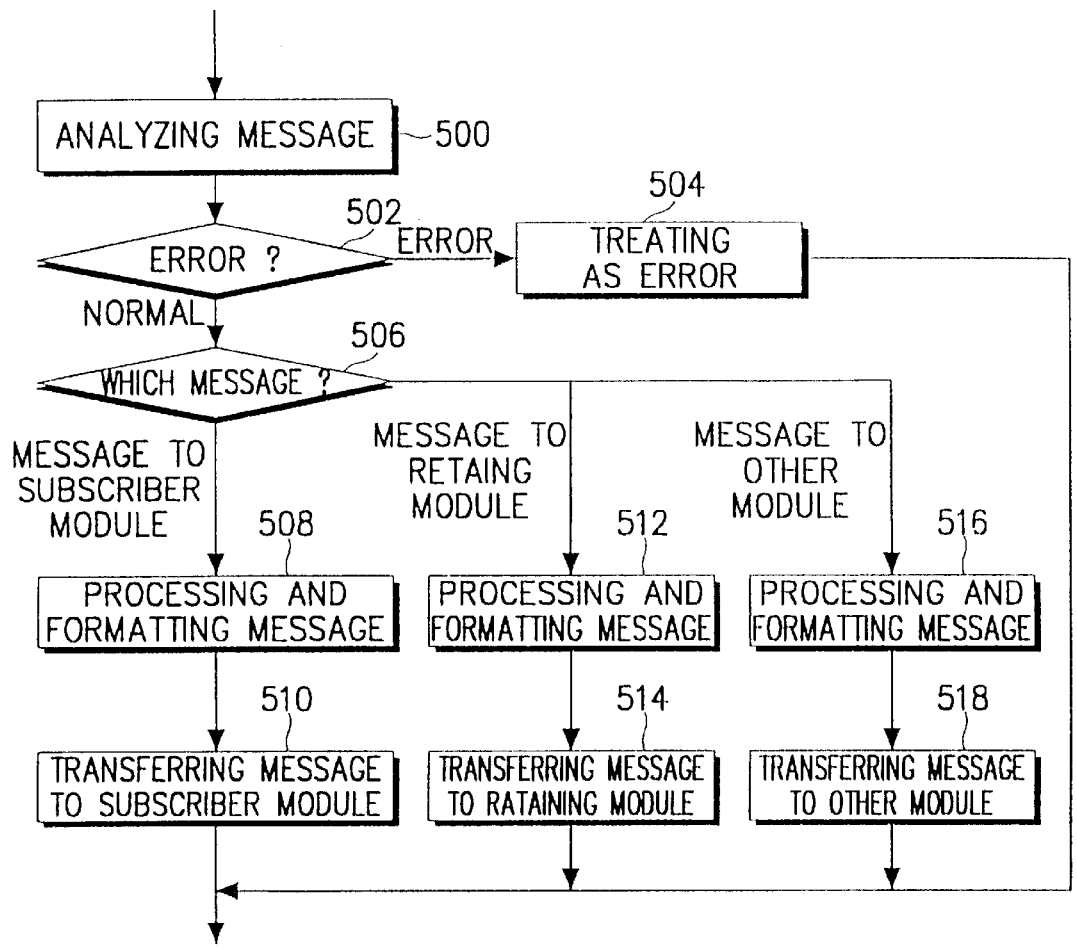
FIG. 5 is a flow chart for illustrating the function of the inventive network module to control the message transferred to a subscriber module and a retaining module.

Describing more specifically the function of the network module 50 to control the message transferred to the subscriber module 12 and the retaining module 14 with reference to the flow chart of FIG. 5, the network module 50 analyzes the message in step 500 to determine in step 502 whether it is error or normal. The error message is treated in step 504. Otherwise, it is determined in step 506, according to the analysis, which branch the normal message should be transferred to. Thus, the message is processed and formatted in step 508, 512 or 516 to be transferred to the subscriber module 12, retaining module 14 or other related module in step 510, 514 or 518.

Figure 6:
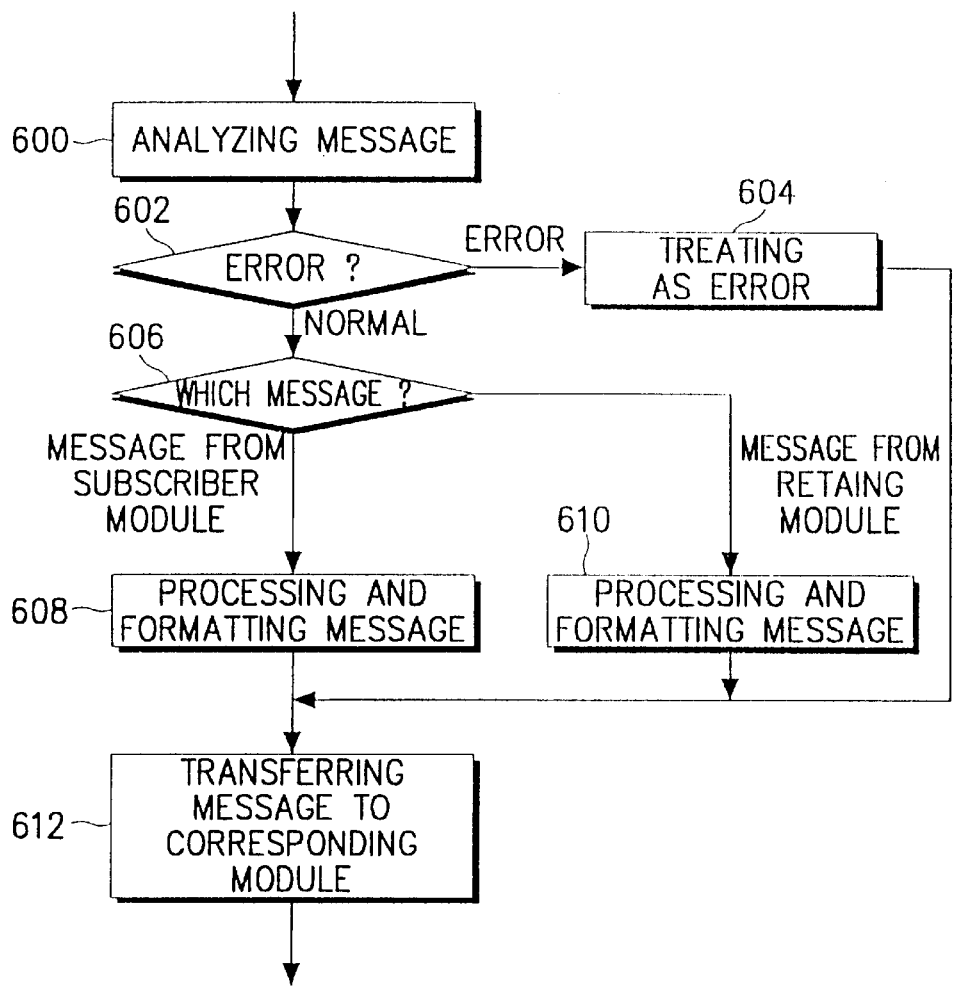
FIG. 6 is a flow chart for illustrating the function of the inventive network module to control the message coming from the subscriber and retaining modules.

Conversely, describing the function of the network module 50 to control the message coming from the subscriber and retaining modules 12 and 14 with reference to the flow chart of FIG. 6, the network module 50 analyzes the message in step 600 to determine in step 602 whether it is error or normal. The error message is treated in step 604. Otherwise, it is determined in step 606 where the normal message has come from. Thus, the message is processed and formatted in step 608 or 610 to be transferred to the corresponding module in step 612 according to where the message has come from, the subscriber or retaining module 12 or 14.

The inventive network hierarchy inherently provides the following three advantages:

Firstly, there is no message conversion and distribution module which requires message exchange with the network module. This saves the capacity of the executable memory since it is not necessary to allocate the memory for the message exchange between the message conversion and distribution module and the network module.

Secondly, it is not necessary to check which protocol should be exchanged between the network module and the message conversion and distribution module as in the conventional network hierarchy. This facilitates programming and prevents errors during execution of the program.

Thirdly, the fact that there is no message conversion and distribution module allows each module to use additional storage space of the executable memory in the operation of the software. This also speeds up the data processing because the size of the program is reduced.

Having described preferred methods of a novel system of processing, converting and distributing a message in a fixed subscriber unit in a broad band code division multiple access wireless local loop (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for processing, converting and distributing a message in a network hierarchy of a fixed subscriber (FSU) in a Broad band Code Division Multiple Access Wireless Local Loop (B-CDMA WLL), said system having:
    seven layers in the network hierarchy comprising:
    a first layer for providing physical/medium access control;
    a second layer including a data link control; and
    a third layer including a network module coupled directly to the data link control and higher layers including a subscriber module and a retaining module, wherein after analyzing the message to determine whether there is an error or not, said network module upgrades the speed of processing data by processing, converting, and distributing messages to and from the subscriber module and the retaining module.

2. The system as recited in claim 1, wherein the first layer further comprises a subscriber line interface circuit module (SLIC2) coupled to the subscriber module and a physical/medium access control unit coupled to the lower layer management entity and the data link control.

3. The system as recited in claim 2, wherein the first layer further comprises a ADPCM/PCM module coupling the subscriber line interface circuit module and the physical/medium access control unit.

4. The system as recited in claim 1, further comprises a radio carrier station for transmitting and receiving radio signals to and from the FSU.

5. A network hierarchy of a fixed subscriber unit (FSU) in a Broad band Code Division Multiple Access Wireless Local Loop (B-CDMA WLL) providing increased data processing speed and reduced memory storage space, said system having:
    seven layers in the network hierarchy comprising:
    a first layer being provided with a subscriber line interface circuit module (SLIC2), ADPCM/PCM module, medium access control (MAC) module, physical (PHL) module and a lower layer management entity (LLME), a second layer being provided with a data link control module (DLC), a third layer being provided with a network module coupled directly to higher layers including a subscriber module and a retaining module,
    wherein after analyzing a message to determine whether there is an error or not, said network module processes, converts and distributes the message among said LLME, said subscriber module, and said retaining module.

6. The system as recited in claim 5, further comprises a radio carrier station for transmitting and receiving radio signals to and from the FSU.

* * * * *